No. 811,602. PATENTED FEB. 6, 1906.
A. S. WATTS.
MOLD FOR PLASTIC MATERIALS.
APPLICATION FILED SEPT. 29, 1905.

Witnesses
Walter B. Payne
Clarence A. Bateman

Inventor
Arthur S. Watts
by
Frederick G. Church
his Attorney

UNITED STATES PATENT OFFICE.

ARTHUR S. WATTS, OF VICTOR, NEW YORK, ASSIGNOR TO THE LOCKE INSULATOR MANUFACTURING COMPANY, OF VICTOR, NEW YORK, A CORPORATION OF NEW YORK.

MOLD FOR PLASTIC MATERIALS.

No. 811,602.                      Specification of Letters Patent.                      Patented Feb. 6, 1906.

Application filed September 29, 1905. Serial No. 280,630.

*To all whom it may concern:*

Be it known that I, ARTHUR S. WATTS, of Victor, in the county of Ontario and State of New York, have invented certain new and useful Improvements in Molds for Plastic Materials; and I do hereby declare the following to be a full, clear, and exact description of the same, reference being had to the accompanying drawings, forming a part of this specification, and to the reference-numerals marked thereon.

My present invention relates to improvements in molds for forming insulators and similar articles of plastic material, and has for its object to provide a mold to be used in the manufacture of high-tension porcelain insulators, whereby the portions of the insulator, and particularly the edges of the petticoats, may be of uniform density, so as not to be liable to be punctured by high-voltage currents, and at the same time the porcelain will be dense and homogeneous throughout. This result is obtained by arranging an air vent or aperture in the die or plunger which comprehends the entire edge of the petticoat or similar part of the molded article, so that while the air is permitted to escape from the recessed portion of the die or form the article is pressed evenly up to this extreme edge.

This invention is an improvement upon and particularly applicable to the machine shown in Letters Patent No. 716,343, granted December 16, 1902, to F. M. Locke, in which is shown a die for molding insulators with separate air-vents at the edges of the petticoat; but the objection to this patented arrangement is that where the isolated holes are employed clay is squirted out of these molds and at these points is put under less pressure than at portions not so vented, resulting in uneven amount of compactness in the clay after being formed, which results in cracking the edge of the petticoat, and I have found that by forming these apertures into a continuous annular slot through which first the air is ejected and then a very narrow portion of the plastic clay is squirted out the portions of the petticoat being formed are subjected to the same pressure and the result is very satisfactory.

To these and other ends the invention consists in certain improvements and combinations of parts, all as will hereinafter more fully appear, the novel features being pointed out in the claims at the end of the specification.

Figure 1:
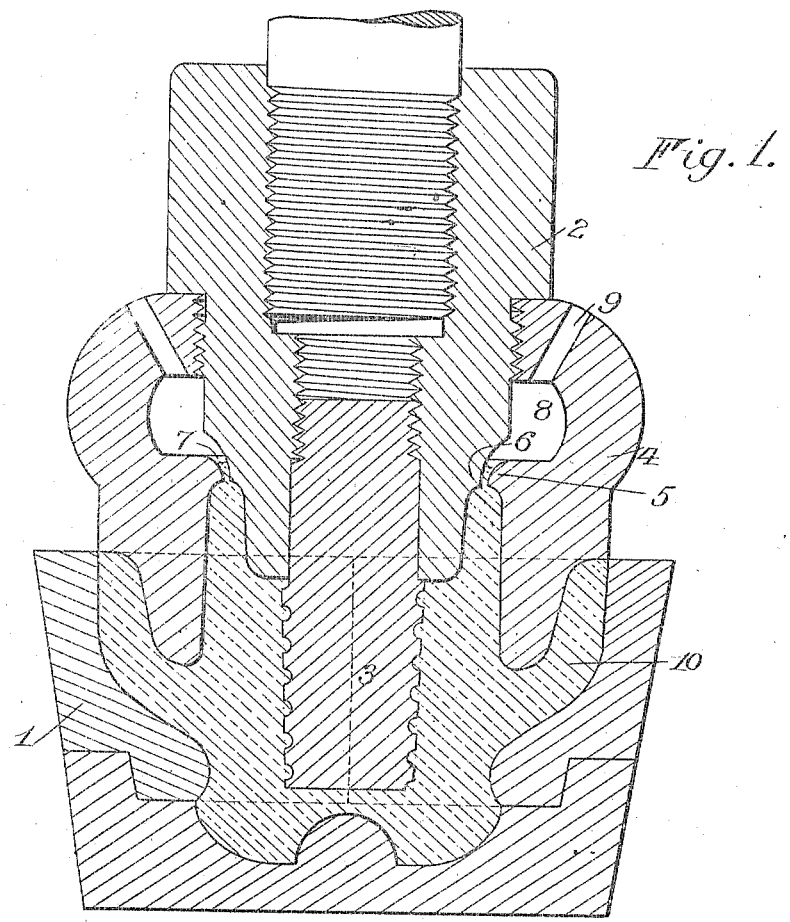
Figure 2:
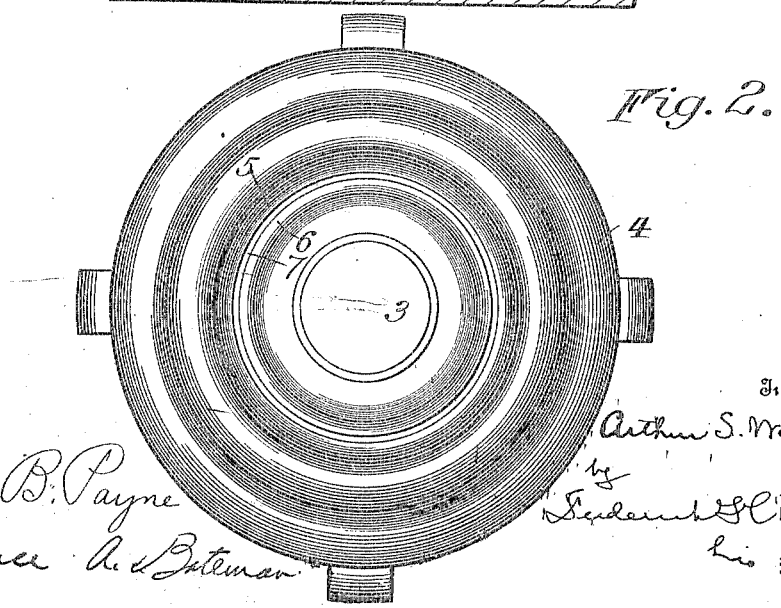

In the accompanying drawings, Figure 1 is a vertical sectional view of a plunger and mold constructed in accordance with my invention and adapted to be used with a machine such as contained in said patent. Fig. 2 is an end view of the plunger or die.

Similar reference-numerals in both figures indicate similar parts.

1 indicates a mold for shaping the exterior or top of the insulator, which in use is preferably stationary, while the mold-section carried upon the plunger or movable portion of the press consists, preferably, of a head 2, provided with a projecting pin 3 at its lower end threaded on the exterior, as shown, for molding the thread in the insulator, and 4 indicates a collar or mold-section secured to the head 2, preferably by a threaded connection, as shown, the lower surface of this collar cooperating with the lower portion of the head to give the desired contour to the bottom of the insulator being formed, the inner shoulder 5 of this collar 4 and the shoulder 6 on the head 2 serving to mold the lower edge of the petticoat. The shoulders are separated to form a narrow passage 7, communicating with the chamber 8, that is open to the air by means of apertures 9 or otherwise. When the mold-sections are brought together and the one carrying the pin 5 is rotated, the plastic material (indicated by 10) is forced up between the shoulders 5 and 6, the air is expelled through the narrow annular channel 7, and a very small portion of the plastic material is squirted into the chamber 8; but the channel is so narrow that a practically uniform pressure is given to the edge of the petticoat and the very thin edge of the plastic material not compressed to the same degree, as the balance of the petticoat may be finished by hand and effectually covered by the glazing material afterward applied.

The product formed by the use of the molds just described is found in practice to be superior to that in which the separate vent-apertures are employed for the reasons previously stated. While it is preferred that this form of mold be used in connection with the machine referred to, in which it is given a rotary motion and is the movable member, this is not essential.

While I have shown the mold as constructed to form a single petticoat on the insulator, it is obvious that it could be readily modified to form several, as in the beforementioned Letters Patent, without departing from my invention.

I claim as my invention—

1. A mold for plastic material embodying two coöperating members between which the plastic material is pressed, one of said members having an annular recess for forming a flange on the molded article and a narrow annular passage at the bottom of said recess for permitting the passage of air.

2. A mold for forming insulators from plastic materials embodying two coöperating members between which the material is pressed, one of said members having the annular recess for forming a petticoat on the insulator and a narrow annular passage at the extreme bottom of said recess for permitting the exit of air and an exceedingly narrow film of the material being molded, and the other mold member forming the exterior of the insulator.

3. A mold for forming insulators from plastic material embodying a member by which the material is pressed, said member having an annular shoulder thereon and having an outer annular section provided with a shoulder thereon corresponding to the first-mentioned shoulder to mold the edge of an insulator-petticoat and a narrow annular channel between said shoulders through which the air and a film of plastic material narrower than the petticoat may escape.

4. In a mold for forming insulators from plastic materials, the combination with a head provided with the annular shoulder 6, and a threaded projection extending beyond it, of an outer removable section 4 provided with an annular shoulder 5 corresponding to the shoulder 6, and separated therefrom by a narrow channel 7.

5. The combination with the mold-head having the shoulder 6, the projection 3 secured in the end of the head and having the exterior threaded portion, of the annular member 4 secured to the exterior of the head provided with the shoulder 5 arranged in close proximity to the shoulder 6 on the head to form a narrow passage 7 and the annular chamber 8.

ARTHUR S. WATTS.

Witnesses:
 JOHN S. LAPP,
 HENRY M. PARMELE.